No. 664,161. Patented Dec. 18, 1900.
C. W. LEVALLEY.
CHAIN.
(Application filed Sept. 29, 1898.)
(No Model.) 2 Sheets—Sheet 1.

Witnesses Inventor
Christopher W. Levalley,
by J. H. Doubleday,
Attorney.

THE NORRIS PETERS CO., PHOTO-LITHO., WASHINGTON, D. C.

No. 664,161. Patented Dec. 18, 1900.
C. W. LEVALLEY.
CHAIN.
(Application filed Sept. 29, 1898.)
(No Model.) 2 Sheets—Sheet 2.
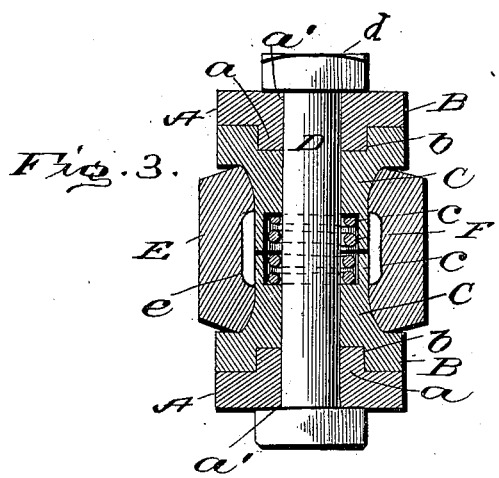
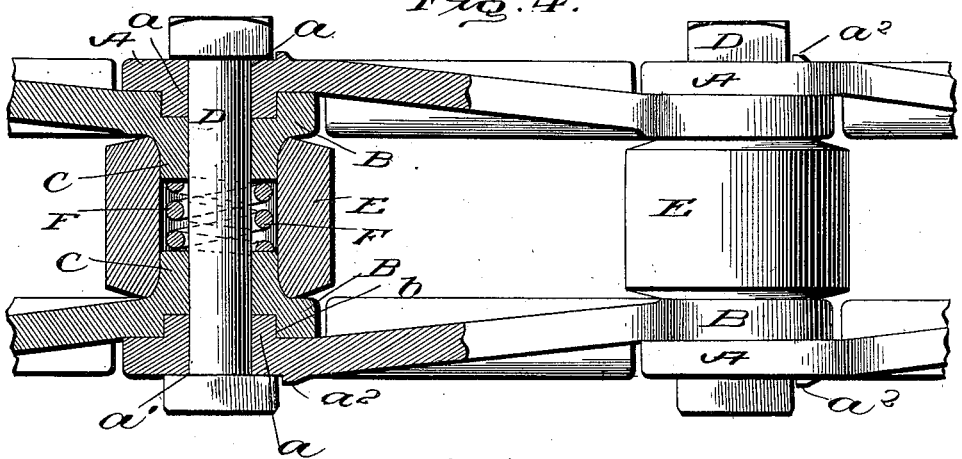
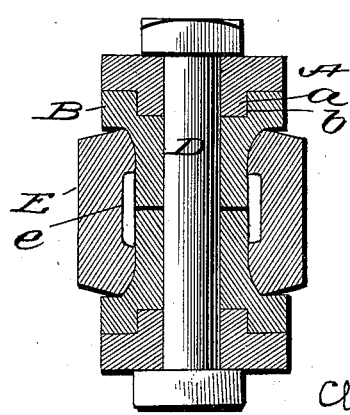
Witnesses
Inventor
Christopher W. Levalley,
by H H Doubleday, Attorney

UNITED STATES PATENT OFFICE.

CHRISTOPHER W. LEVALLEY, OF MILWAUKEE, WISCONSIN.

CHAIN.

SPECIFICATION forming part of Letters Patent No. 664,161, dated December 18, 1900.

Application filed September 29, 1898. Serial No. 692,245. (No model.)

*To all whom it may concern:*

Be it known that I, CHRISTOPHER W. LE-VALLEY, a citizen of the United States, residing at Milwaukee, in the county of Milwaukee and State of Wisconsin, have invented certain new and useful Improvements in Chains, of which the following is a specification, reference being had therein to the accompanying drawings.

Figure 1:
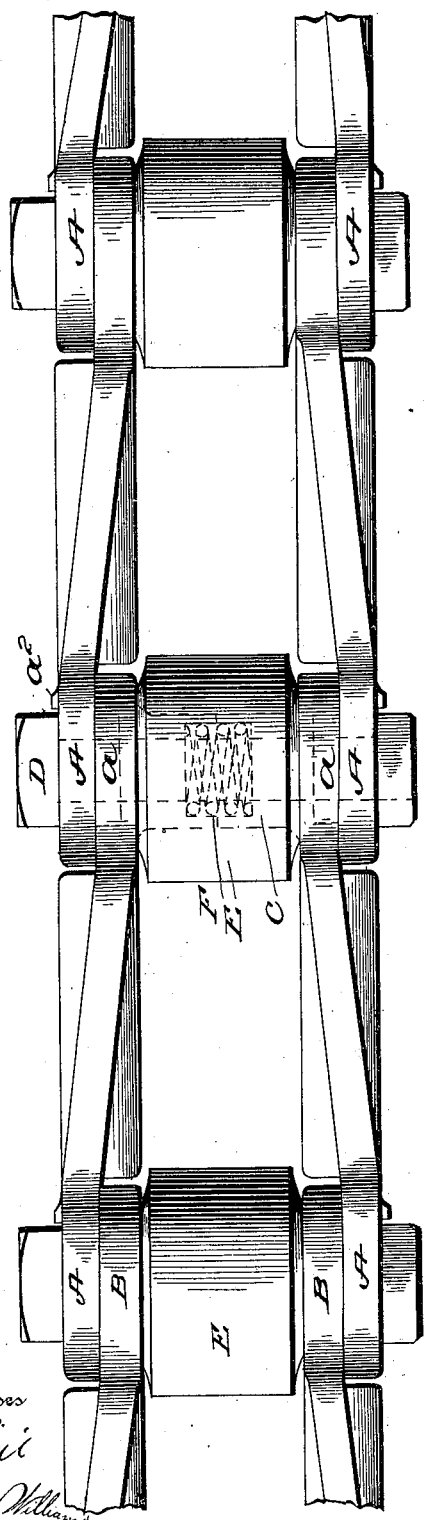
Figure 2:
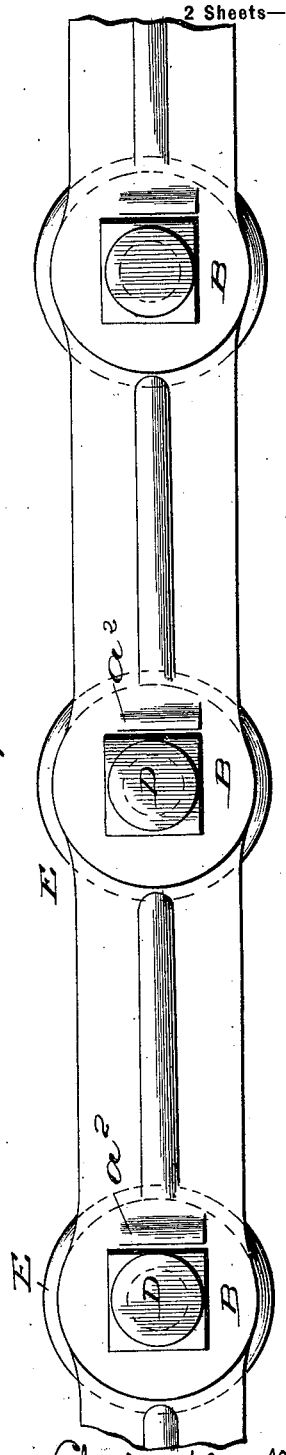

Figure 1 is a plan view. Fig. 2 is a side elevation. Fig. 3 is a section on line $xx$, Fig. 1. Fig. 4 is a plan view, partly in horizontal section, showing a different form of the invention from that illustrated in the figures already described. Fig. 5 is a cross-sectional view through one of the joints of a chain somewhat different from that shown in any of the other figures.

Similar reference-letters refer to similar parts in all the figures.

Referring particularly to Figs. 1, 2, and 3, the side bars A B are duplicates of each other, are separable from each other, and are interchangeable, as is common in this general class of chains, and I will describe them in the singular. The end A is provided upon its inner face with an annular hub or boss $a$, which is concentric with a hole $a'$, formed to receive a bolt or rivet. The opposite end B has a similar bolt-hole or rivet-seat, and is formed with a circular recess $b$ upon its outer face of such dimensions as will receive and fit somewhat closely the annular hub $a$ of the overlapping end A of the adjacent side bar of the chain. The end B is at its inner face expanded into a sleeve or hub-like bearing C, the latter being in the preferred form provided with a circumferential flange $c$, projecting inward from its inner end, surrounding the bolt-hole, and forming a socket-like recess at that point. (See Fig. 3.) The outer surface of this flange is continuous with the outer surface of the sleeve C and constitutes an extension of its bearing-surface. The length of the sleeves is such that when the parts are assembled into a chain there will be a narrow space between their adjacent ends, as and for a purpose which will be explained.

D is a rivet or bolt, preferably fitting somewhat closely its seats in the ends of the side bars which have been described.

E is an antifriction roller or wheel mounted on the sleeves or hub-like bearings and adapted to rotate freely thereon. I propose to core out a recess or chamber $e$ in the roller for the reception of some appropriate sort of lubricant.

F is a spring disposed between the ends of the sleeve-like portions C of the side bars of the link, and in a construction like that shown in Fig. 3 within the socket-like recess which is formed by the opposing circumferential flanges $c$ $c$ and the shoulders or walls of the sleeves at the bases of the said flanges and the shoulders form abutments which receive the outward thrust of the spring when the latter is under compression, as will be readily understood from an examination of Fig. 3.

The proportions and relations of all the parts should preferably be such that when assembling them into a chain the nut $d$ of the bolt D can be screwed on far enough so that the spring will be put under a quite high tension, and its recoil will not only hold the side bars far enough to prevent friction against the ends of the antifriction-roller, but will prevent the said nut from backing off because of its engagement with the stop $a^2$, which projects from the side bar and engages with one side of the nut, the spring permitting that end of the side bar to be forced inward enough to allow the corners of the nut to ride over the stop as the nut is being screwed on the bolt. A corresponding stop $a^2$ prevents the head of the bolt from turning around.

In Fig. 4 the construction of the parts is substantially the same as that in Fig. 3, except that the flanges $c$ $c$ are omitted and the spring F is of somewhat greater diameter, so that the outer surfaces of the convolutions are in line, or thereabout, with the peripheries of the sleeves or hub-like bearings, but are not quite in contact therewith, so as to produce friction as the antifriction-roller rotates.

While I have shown spiral springs, I do not wish to be limited to their use, because a number of different sorts may be substituted therefor—for instance, a set of spring-washers.

In Fig. 5 the construction is still more simplified by the omission of the spring, the sleeves being lengthened so as to practically meet at the center of the bolt when the nut is screwed up to place; but in this construction there can be a little distance between the ends of the sleeves under ordinary conditions from the fact that the small amount of taper which will facilitate drawing of the recesses and hubs after casting will when the chain is under tension ordinarily insure that the ends A A of the side bars will be spread apart, so as to hold them firmly against the bolt-head and nut, and the stops $a^2$ will prevent the nut from backing off.

One of the objects of the present invention is to produce a drive-chain consisting of separate side bars and connecting cross-bolts or pintles, and particularly a chain of this character, which is provided with antifriction-rollers surrounding the cross-bolts or pintles, in which the cross-bolts or pintles are relieved of strain to a great extent, the strain being taken by the side bars of the links, such side bars being so constructed as to have interlocking projections at the places where they articulate, whereby the strain is transmitted from one link to the next directly through the side bars and without being to any material extent transmitted to and through the cross-bars or pintles. Heretofore in chains of this character where antifriction rollers or sleeves surrounding the cross-bolts or pintles have been used to engage with the teeth of the sprocket or drive wheel in order to reduce the friction incident to such engagement such sleeves or rollers have had direct engagement with the cross-bolts or pintles, with the result that the force or strain applied to the roller by reason of its engagement with a tooth of the wheel has been transmitted directly to the cross-bolt or pintle, or where it has been attempted to prevent this by causing the ends of the sleeve or roller to have interlocking engagement with the side bars—as, for instance, in the form of chain illustrated in and forming the subject-matter of my heretofore-filed application for Letters Patent, Serial No. 663,621, filed December 27, 1897—there is nevertheless a transverse strain imparted to the cross-bolt or pintle as soon as the sleeve or roller begins to wear in its seats in the side bars. I now entirely relieve the cross-bolts or pintles from direct transverse strain imparted to them by the antifriction sleeves or rollers by mounting such sleeves or rollers upon the inward-extending hub-like bearings C of the side bars and entirely out of engagement with the cross-bolts or pintles.

Under some conditions I propose to omit the antifriction-rollers, in which event the sprocket-teeth of the wheels will engage directly with the sleeves or hub-like inward projections C of the side bars. It will be evident that such a construction is perfectly practical and operative in a form of chain like that shown in Figs. 1, 2, and 3, where springs are employed between the hub-like inward-projecting bearings to hold the interlocking parts of the chain properly in engagement.

What I claim is—

1. A chain, having in combination, side bars provided with interlocking annular hubs and corresponding recesses connecting their overlapping faces, each bar having at one end an inward-projecting sleeve or hub-like bearing, bolts connecting the overlapping ends of the side bars, and antifriction-rollers mounted entirely on the said hub-like bearings and entirely out of engagement with the connecting-bolts, substantially as set forth.

2. A chain, having in combination, side bars provided with interlocking ends and with inward-projecting sleeves or hub-like bearings, bolts connecting the ends of the side bars, and springs interposed between the ends of the sleeves, substantially as set forth.

3. A chain, having in combination side bars provided with interlocking ends, and with inward-projecting hub-like bearings, cross-bolts uniting the side bars extending through said bearings, springs interposed between the ends of the said bearings which tend to separate the side bars and maintain their interlocking parts in close engagement, and the antifriction-rollers mounted on the said hub-like bearings and inclosing the springs, substantially as set forth.

4. A chain, having in combination separable side bars, cross-bolts uniting said side bars, and nuts having screw-threaded engagement with the bolts, the side bars being formed with stops which prevent the turning of the said nuts and bolts relative to each other, and means for forcing the side bars outward under the working conditions of the chain to cause the said stops to operatively engage with the bolts and nuts, substantially as set forth.

5. A chain, having in combination separable side bars, cross-bolts uniting said side bars, nuts having screw-threaded engagement with the bolts, the side bars being formed with stops which prevent the turning of the nuts and bolts relative to each other, and means which tend to force the side bars apart to cause the said stops to operatively engage with the bolts and nuts, such means being yielding to permit intentional removal from or application to the bolts of the nuts, substantially as set forth.

In testimony whereof I affix my signature in presence of two witnesses.

CHRISTOPHER W. LEVALLEY.

Witnesses:
A. G. NETTER,
R. KRETCHMAR, Jr.